United States Patent
Muskos

(10) Patent No.: US 8,096,595 B2
(45) Date of Patent: Jan. 17, 2012

(54) BUMPER BEAM

(75) Inventor: Per Muskos, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 256 days.

(21) Appl. No.: 12/312,206

(22) PCT Filed: Nov. 8, 2007

(86) PCT No.: PCT/SE2007/000991
§ 371 (c)(1),
(2), (4) Date: Apr. 29, 2009

(87) PCT Pub. No.: WO2008/057025
PCT Pub. Date: May 15, 2008

(65) Prior Publication Data
US 2009/0273197 A1    Nov. 5, 2009

(30) Foreign Application Priority Data

Nov. 9, 2006 (SE) .................................. 0602379
Jul. 5, 2007 (SE) .................................. 0701630

(51) Int. Cl.
*B60R 19/04* (2006.01)
(52) U.S. Cl. ........................... 293/120; 293/102

(58) Field of Classification Search ............... 293/102, 293/120
See application file for complete search history.

(56) References Cited

U.S. PATENT DOCUMENTS

| | | |
|---|---|---|
| 6,669,252 B2 | 12/2003 | Roussel et al. |
| 6,971,691 B1 | 12/2005 | Heatherington et al. |
| 7,703,820 B2 * | 4/2010 | Perarnau Ramos et al. .. 293/155 |
| 2004/0007886 A1 * | 1/2004 | Hallergren .................. 293/102 |

FOREIGN PATENT DOCUMENTS

| | | |
|---|---|---|
| DE | 10327008 B3 | 1/2005 |
| DE | 10 2005 017 956 A1 | 10/2006 |
| SE | 527 530 C2 | 4/2006 |
| SE | 0502759 A | 10/2006 |
| WO | WO 0230714 A1 | 4/2002 |
| WO | WO 2006002531 A1 | 1/2006 |
| WO | WO 2007/084044 A1 | 7/2007 |

* cited by examiner

*Primary Examiner* — Joseph Pape
(74) *Attorney, Agent, or Firm* — Mark P. Stone

(57) ABSTRACT

A bumper beam has a generally U shape with a central flange (12; 12') and two webs (13, 14; 13', 14'), which central flange in the longitudinal middle portion of the beam points outwards from a vehicle and has a longitudinal concavity (17; 17'), which deepens progressively towards the end portions of the beam in order to change to or connect to fastening plates (20, 21; 20', 21').

20 Claims, 7 Drawing Sheets

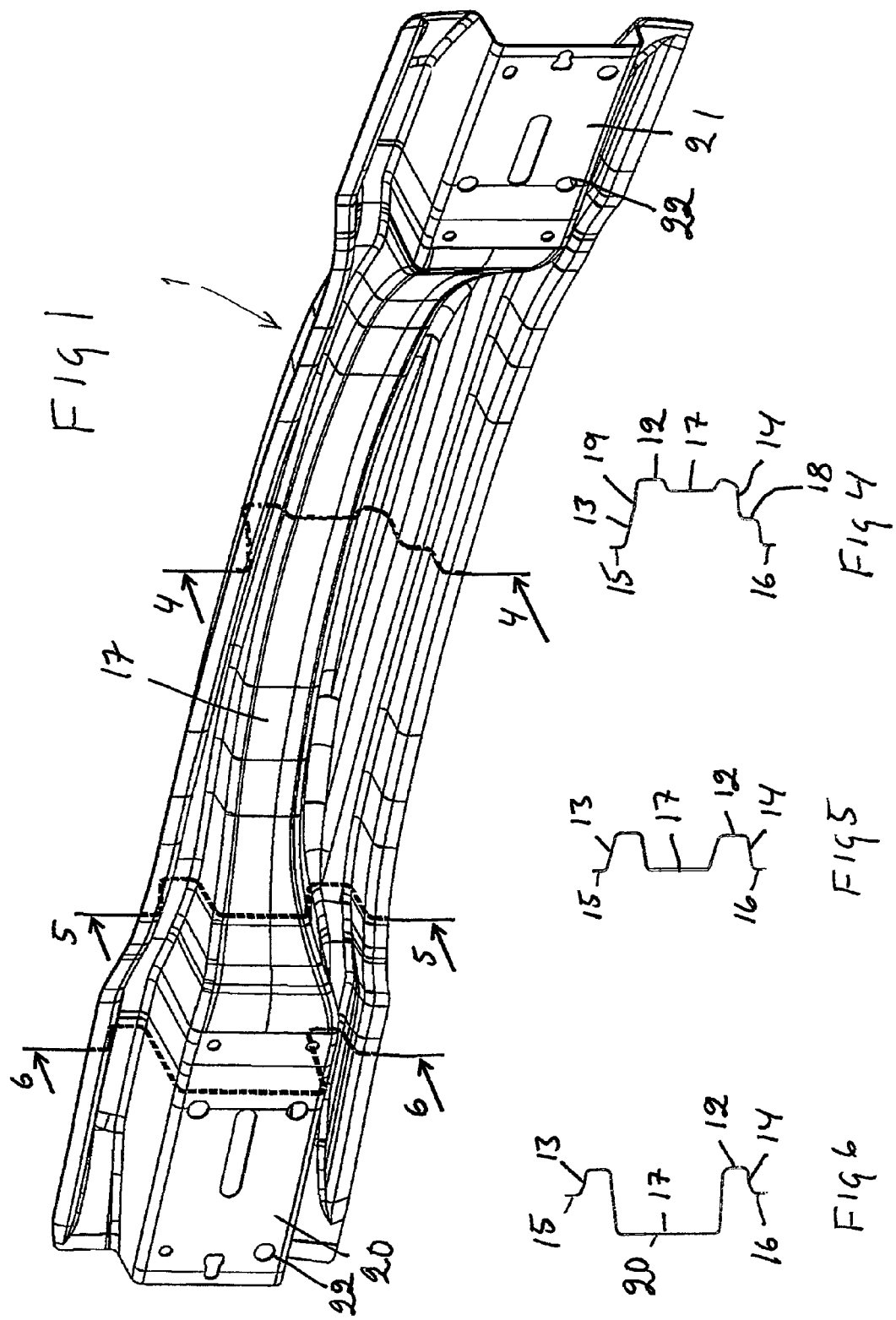

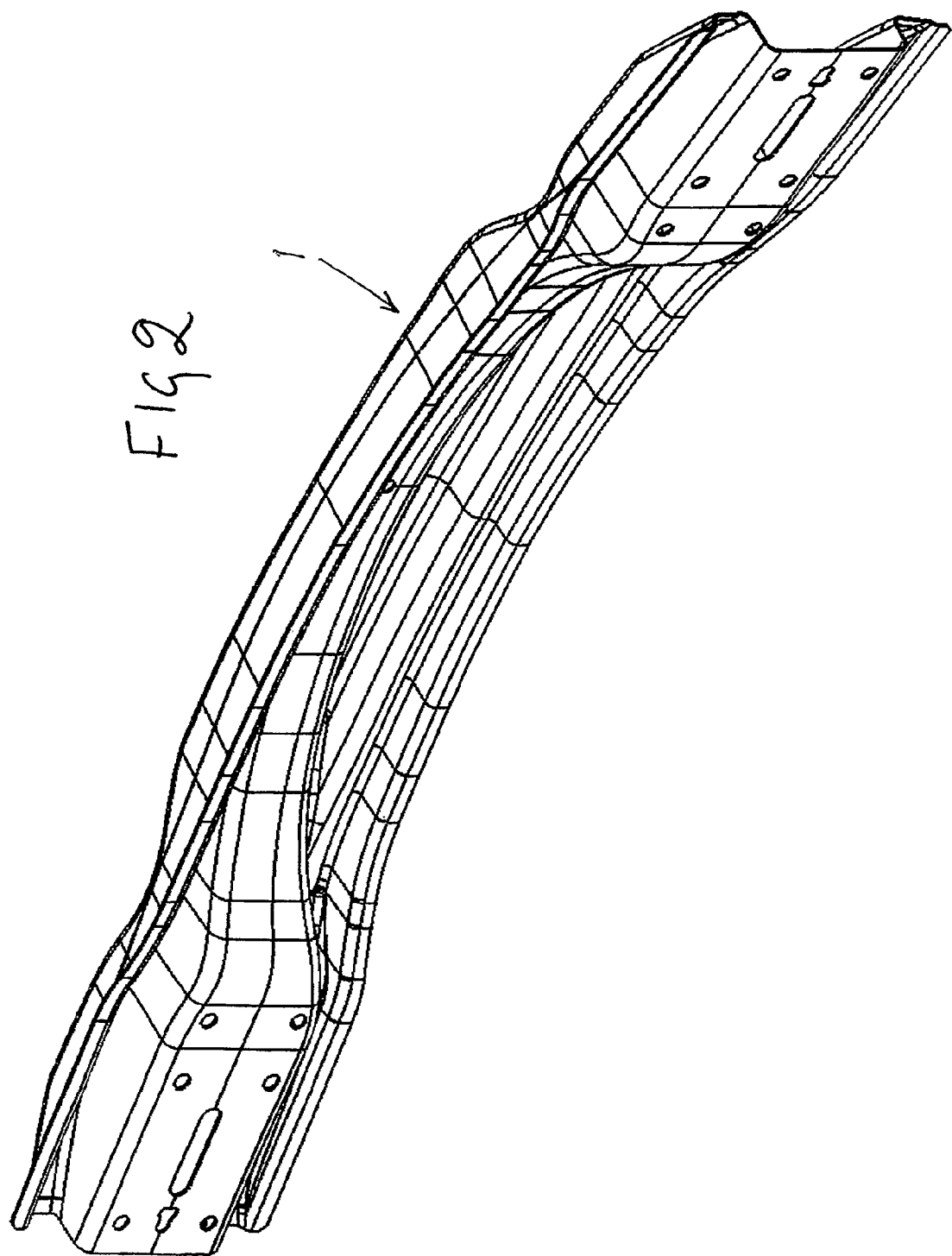

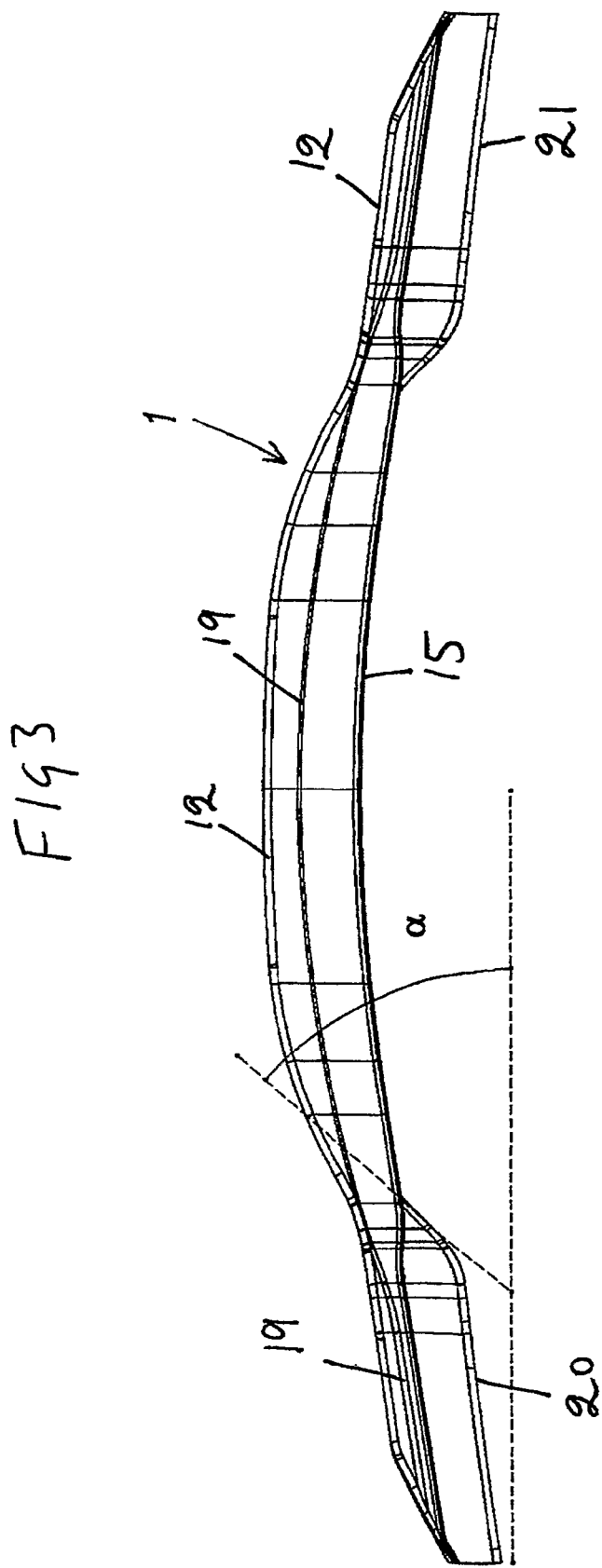

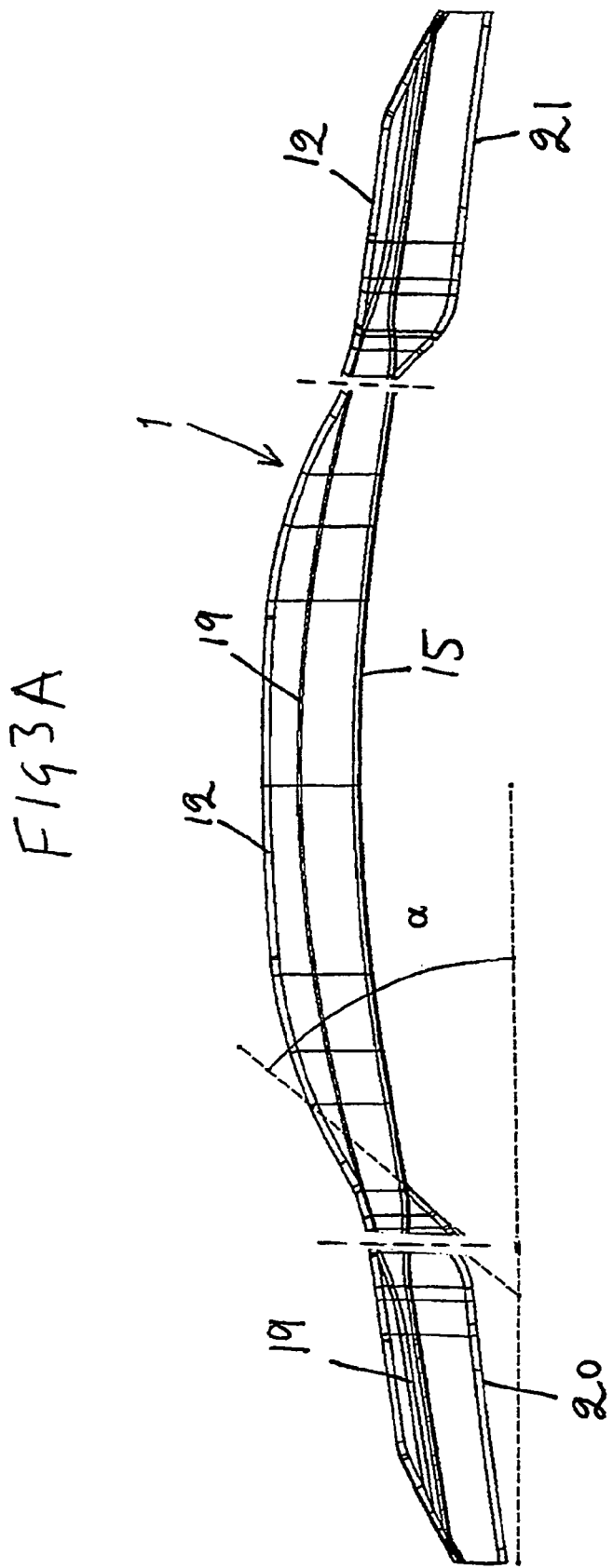

BUMPER BEAM

TECHNICAL FIELD

The present invention relates to a bumper beam according to the preamble of claim 1.

BACKGROUND TO THE INVENTION

A front bumper beam is most often fitted in crash boxes, whereas a rear bumper is often fitted directly in the vehicle without crash boxes. In such cases, the bumper beam often has a generally U shape with the central flange pointing outwards from the vehicle and a longitudinal concavity in the central flange. Its fastening portions are provided with high webs so that they perform a function corresponding to the crash box function. The bumper beam may have side flanges with screwholes for fastening to the vehicle as described in SE-527530-C2 or have screwholes in the sides as described in WO-2006/002531-A1.

According to the invention, the concavity deepens progressively towards the end portions of the beam until it constitutes or changes to fastening plates. This makes it possible to fasten the bumper beam to a fastening surface of the vehicle which is narrower than the width of the bumper beam. A further result is a lower profile height of the outer portions of the bumper beam, which may be an advantage from the design point of view. The regions adjacent to the fastening plates are strengthened, resulting in advantageous deformation behaviour in the event of a collision.

OBJECT OF THE INVENTION

An object of the present invention is to provide a bumper beam whose construction is particularly advantageous from the deformation point of view and the energy absorption point of view at the time of a collision.

The object of the invention is achieved by the bumper beam having the characteristics indicated in the claims.

BRIEF DESCRIPTION OF THE DRAWINGS

FIG. 1 is a perspective view of an embodiment example of the invention as seen from inside the vehicle and obliquely from above.

FIG. 2 is a perspective view of the same bumper beam as depicted in FIG. 1 as seen from inside and obliquely from above.

FIG. 3 is a top view of the bumper beam according to FIG. 1.

FIG. 3A corresponds to FIG. 3 except that it illustrates fastening plates which are connected to the ends of the bumper beam.

FIG. 4 is a section taken along the line 4-4 in FIG. 1.

FIG. 5 is a section taken along the line 5-5 in FIG. 1.

FIG. 6 is a section taken along the line 6-6 in FIG. 1.

DETAILED DESCRIPTION OF EMBODIMENT EXAMPLES DEPICTED

Figure 7:
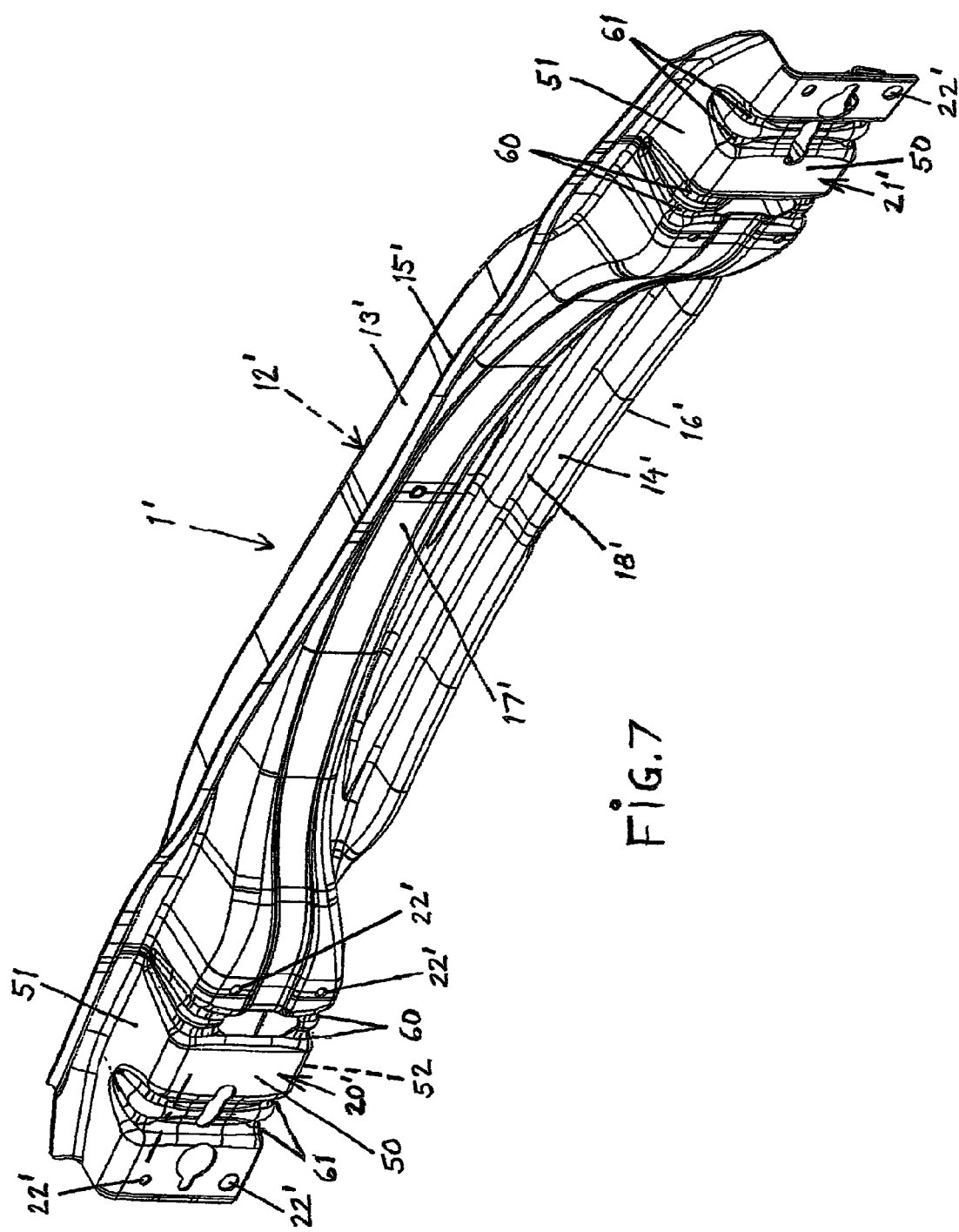
FIG. 7 is a perspective view of another embodiment example of the invention as seen from inside the vehicle and obliquely from above.

The bumper beam 1 depicted in FIGS. 1-6 is formed from a planar sheetmetal blank. It has a generally U-shaped cross-section in its middle portion as illustrated in FIG. 4. It has a central flange 12 and two webs 13, 14. The webs end with side flanges 15, 16, i.e. the profile is a hat profile. The central flange has a shallow concavity 17 and the lower web 14 has a step 18. The upper web has a small change of angle 19 which is almost imperceptible but serves as a deformation trigger to provide controlled deformation in the event of a collision load. The step 18 of the lower web also serves as a deformation trigger.

The shallow concavity 17 deepens towards the ends of the beam, and at the section 5-5 (FIG. 5) is equal in depth to the height of the web. In this region the bottom of the concavity is at an angle $\alpha$ to the transverse direction of the vehicle which is greater than 30 degrees (it is depicted as approximately 45 degrees), i.e. the bottom of the concavity is at an acute angle to the transverse direction as seen in a horizontal plane as in FIG. 3.

The concavity 17 levels out in fastening plates 20,21 adapted to corresponding fastening surfaces in loadbearing portions of the vehicle. The fastening plates have a number of holes 22 for bolts. The concavity 17 broadens at the same time as it deepens, so that the fastening plates are of suitable width. The bumper beam in the embodiment depicted ends with the fastening plates but may alternatively continue past the fastening plates, depending on the design of the vehicle.

As Illustrated by FIGS. 1-2 and 4-6 of the drawing, the concavity 17 substantially continuously deepens in a direction from the proximate longitudinal center of the bumper beam 1 towards the ends of the bumper beam 1.

The height of the webs 13, 14 decreases progressively as the concavity 17 increases, so the width of the blank need not increase appreciably for the ends of the bumper beam as compared with the middle of the bumper beam. In certain cases, however, it may be advantageous to lengthen the webs at the fastening plates so that the webs make contact with the vehicle more quickly in a collision or even are initially in contact with the vehicle and can directly absorb forces.

Figure 8:
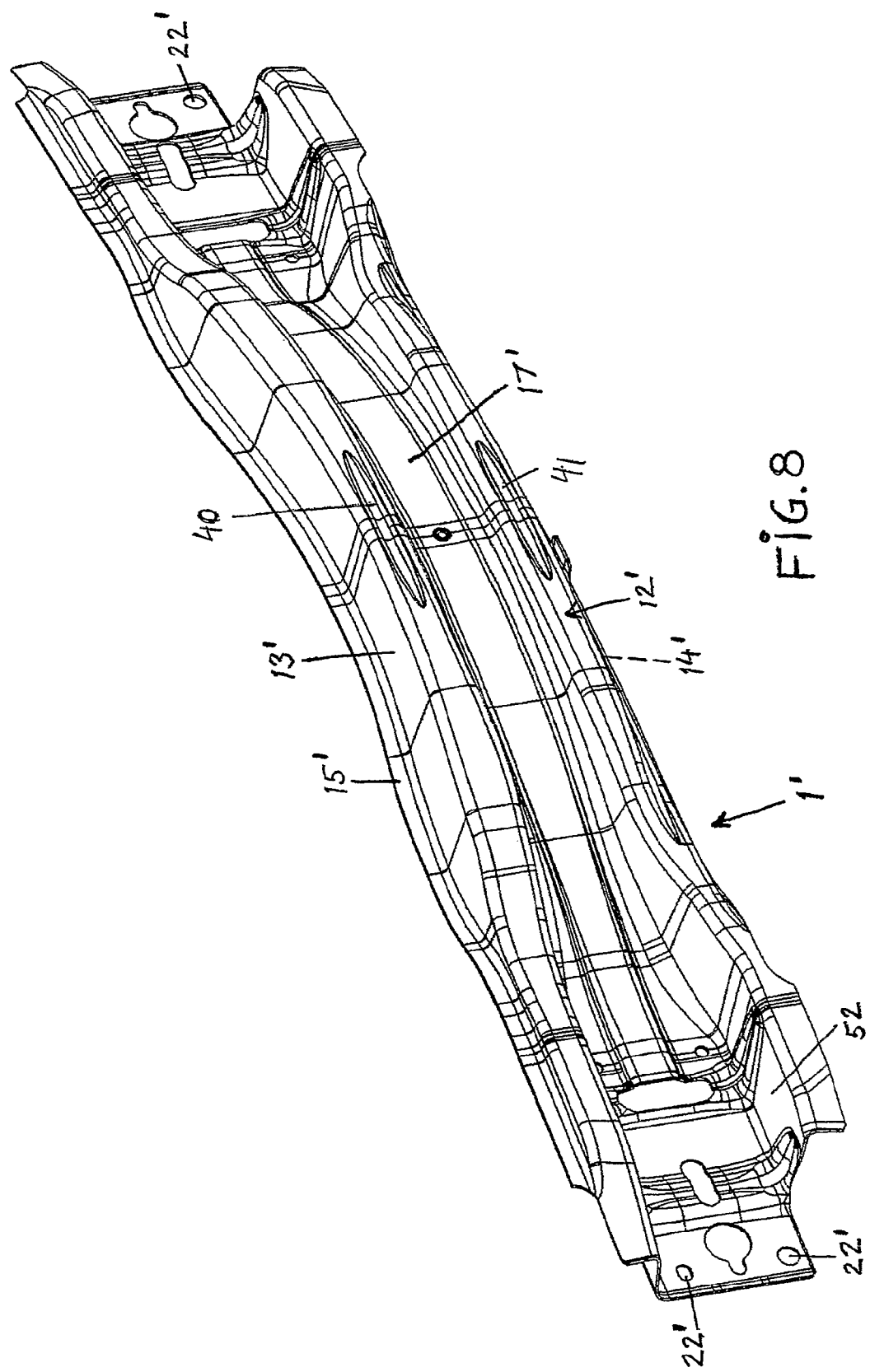
FIG. 8 is a perspective view of the same bumper beam as depicted in FIG. 7 as seen from outside and obliquely from above.
Figure 9:
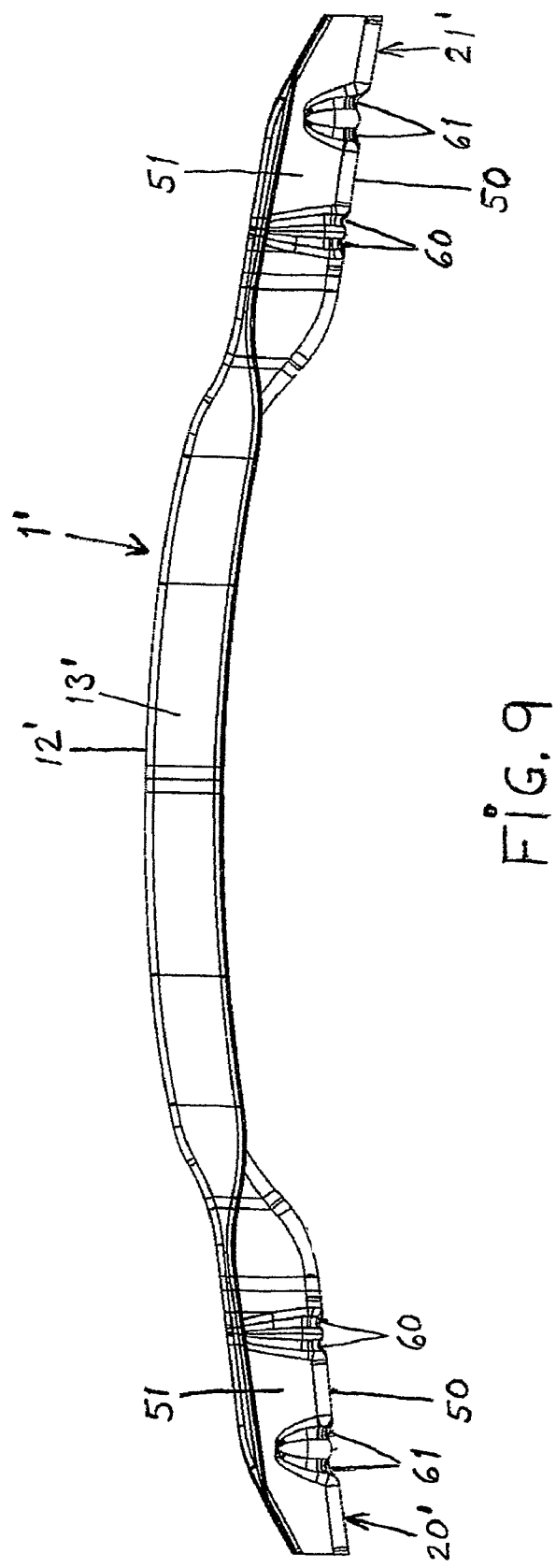
FIG. 9 is a top view of the bumper beam according to FIGS. 7 and 8.

The bumper beam 1' depicted in FIGS. 7-9 is formed from a planar sheetmetal blank. It has a generally U-shaped cross-section in its middle portion as illustrated in the drawings. It has a central flange 12' and two webs 13',14'. The webs end with side flanges 15',16', i.e. the profile is a so-called hat profile. The central flange has a shallow concavity 17' and the lower web 14' has a step 18'. The upper web 13' has a small change of angle which is almost imperceptible but serves as a deformation trigger to provide controlled deformation in the event of a collision load. The step 18' of the lower web also serves as a deformation trigger. In its middle portion, the bumper beam has two longitudinal recesses (depressions) 40,41 situated on the central flange 12', as illustrated in FIG. 8.

The shallow concavity 17' in the central portion of the bumper beam further deepens towards the ends of the beam in order to contribute to the formation of an inverted U shape of the ends of the beam relative to the middle portion of the beam. The geometrical changes of the bumper beam are clearly illustrated in the drawings. The angle $\alpha$ is preferably the same for both embodiments.

The concavity 17' changes to fastening plates 20',21' of a suitable width which are adapted to corresponding fastening surfaces in loadbearing portions of the vehicle. The fastening plates have a number of holes 22' for bolts or the like to allow desired anchoring to the respective vehicle. The aforesaid inverted U profiles in the end portions of the beam each have a central portion 50 and two webs 51,52, which central portions constitute the fastening plates 20' and 21'.

FIGS. 1-3 and 7-9 illustrate that the fastening plates (20, 21; 20', 21') are formed by the opposed ends of the central flange (12, 12') of the bumper beam, while FIG. 3A illustrates that fastening plates (20, 21) are connected to the ends of the central flange (12) of the bumper beam.

The bumper beam 1' in the embodiment depicted ends with the fastening plates 20',21' but may alternatively continue past the fastening plates, depending on the design of the vehicle.

The height of the webs 13',14' decreases progressively as the concavity 17' increases, so the width of the blank need not increase appreciably for the ends of the bumper beam as compared with the middle of the bumper beam. In certain cases, however, it may be advantageous to lengthen the webs 13',14' at the fastening plates so that the webs make contact with the vehicle more quickly in a collision or even are initially in contact with the vehicle and can directly absorb forces.

According to the invention, the fastening plates 20' and 21' are each provided with two transverse pairs of recesses 60,61. The inner pair of recesses 60 extend across the width of the central flange 50 and continue along a large proportion of the web portions 51,52 of the inverted U profile. The outer pair of recesses 61 extend across the width of the central flange 50 and continue along a smaller proportion of the web portions 51,52 of the inverted U profile. The extent of the pairs of recesses 60,61 along the web portions 51,52 is of course adapted to desired functional criteria.

It should be noted that the number of individual recesses or pairs of recesses of the fastening plates 20',21' and their positioning and orientation on the fastening plates can of course be varied as desired. It should also be noted that the extent of the recesses and/or pairs of recesses along the web portions 51,52 can be varied as desired. The invention thus affords great potential for variations in order to achieve desired deformation characteristics.

The fastening plates 20,21 and 20',21' depicted in the drawings have a number of extra holes/apertures in addition to the holes 22,22' intended for anchoring of the bumper beam 1,1' to the respective vehicle. These extra holes are normally provided for manufacturing technology reasons and may of course be omitted or altered within the scope of the invention.

In the examples depicted, the profile in the central section of the beam is not symmetrical. This is merely an adaptation to the design of the vehicle to which the bumper beam is adapted. Other adaptations may also be made within the scopes of the claims.

The invention claimed is:

1. A bumper beam having a generally U shape with a central flange (12; 12') formed as a single element and two webs (13, 14, 13', 14') extending from the top and the bottom of the central flange, respectively; said central flange in a longitudinal middle portion of the beam facing in an outwardly direction from a vehicle on which the bumper beam is mounted, said central flange having a longitudinal concavity (17; 17'), said bumper beam including fastening plates, characterised in that the concavity (17; 17') deepens substantially continuously from the proximate longitudinal center of the beam towards end portions of the beam to form said fastening plates (20, 21, 20', 21') or to connect to said fastening plates (20, 21, 20', 21').

2. A bumper beam according to claim 1, characterised in that the concavity defines a bottom and the bottom of the concavity (17; 17') is at an angle of at least 30 degrees to a transverse direction of the vehicle in a region close to the fastening plates (20, 21, 20', 21').

3. A bumper beam having a generally U shape with a central flange (12; 12') and two webs (13, 14, 13', 14') extending from the top and the bottom of the central flange, respectively; said central flange in a longitudinal middle portion of the beam facing in an outwardly direction from a vehicle on which the bumper beam is mounted, said central flange having a longitudinal concavity (17; 17'), said bumper beam including fastening plates, characterised in that the concavity (17; 17') deepens progressively towards end portions of the beam to form said fastening plates (20, 21, 20', 21') or to connect to said fastening plates (20, 21, 20', 21') the concavity (17) progressively widens as it progressively deepens.

4. A bumper beam according to claim 1, characterised in that the webs end with side flanges (15, 16).

5. A bumper beam according to claim 1, characterised in that the depth of the concavity (17) is greater than the maximum distance that the webs (13; 14) extend from the central flange at a region on the bumper beam at which the concavity forms or is connected to the fastening plates (20, 21).

6. A bumper beam according to claim 1, characterised in that the fastening plates (20; 21') have at least one stiffening element (60, 61).

7. A bumper beam having a generally U shape with a central flange (12; 12') and two webs (13, 14, 13', 14') extending from the top and the bottom of the central flange, respectively; said central flange in a longitudinal middle portion of the beam facing in an outwardly direction from a vehicle on which the bumper beam is mounted, said central flange having a longitudinal concavity (17; 17'), said bumper beam including fastening plates, characterised in that the concavity (17; 17') deepens progressively towards end portions of the beam to form said fastening plates (20, 21, 20', 21') or to connect to said fastening plates (20, 21, 20', 21'), the fastening plates (20; 21') have at least one stiffening element (60, 61), the stiffening element comprises at least one recess (60, 61).

8. A bumper beam according to claim 6, characterised in that the stiffening element extends in a transverse direction of the fastening plates (20', 21').

9. A bumper beam according to claim 6, characterised in that the fastening plates have web portions adjacent thereto, and the stiffening element extends along at least part of said web portions (51, 52) adjacent to the fastening plates (20', 21').

10. A bumper beam according to claim 1, characterised in that the fastening plates (20', 21') are disposed on a central portion (50) of a beam section which has an inverted U shape relative to the U shape of the longitudinal middle portion of the beam.

11. A bumper beam according to claim 1, characterised in that fastening plates (20, 21; 20', 21') have a number of holes (22, 22') for anchoring of the bumper beam to a vehicle.

12. A bumper beam having a generally U shape with a central flange (12; 12') and two webs (13, 14, 13', 14') extending from the top and the bottom of the central flange, respectively; said central flange in a longitudinal middle portion of the beam facing in an outwardly direction from a vehicle on which the bumper beam is mounted, said central flange having a longitudinal concavity (17; 17'), said bumper beam including fastening plates, characterised in that the concavity (17; 17') deepens progressively towards end portions of the beam to form said fastening plates (20, 21, 20', 21') or to connect to said fastening plates (20, 21, 20', 21'), the concavity defines a bottom and the bottom of the concavity (17; 17') is at an angle of at least 30 degrees to a transverse direction of the vehicle in a region close to the fastening plates (20, 21, 20'; 21'), the concavity (17) progressively widens as it progressively deepens.

13. A bumper beam according to claim 7, characterised in that the stiffening element (60, 61) extends in a transverse direction of the fastening plates (20', 21').

14. A bumper beam according to claim 12, characterised in that the webs end with side flanges (15, 16).

15. A bumper beam according to claim 2, characterised in that the webs end with side flanges (15, 16).

16. A bumper beam according to claim 2, characterised in that the depth of the concavity (17) is greater than the maximum distance that the webs (13, 14) extend from the central flange at a region of the bumper beam at which the concavity forms or is connected to the fastening plates (20, 21).

17. A bumper beam according to claim 2, characterised in that the fastening plates (20; 21') have at least one stiffening element (60, 61).

18. A bumper beam according to claim 7, characterised in that the fastening plates have web portions adjacent thereto; and the stiffening element extends along at least part of the web portions (51,52) adjacent to the fastening plates (20', 21').

19. A bumper beam according to claim 8, characterised in that the fastening plates have web portions adjacent thereto, and the stiffening element extends along at least part of the web portions (51, 52) adjacent to the fastening plates (20', 21').

20. A bumper beam according to claim 13, characterised in that the fastening plates have web portions adjacent thereto, and the stiffening element extends along at least part of the web portions (51, 52) adjacent to the fastening plates (20', 21').

* * * * *